3,444,183
     FILM-FORMING COMPOSITION
Leo P. Hubbuch, Lima, Pa., assignor to E. I. du Pont
 de Nemours and Company, Wilmington, Del., a corporation of Delaware
No Drawing. Filed Sept. 22, 1965, Ser. No. 489,425
         Int. Cl. C08g 41/02; C09d 5/24
U.S. Cl. 260—32.6                              6 Claims

ABSTRACT OF THE DISCLOSURE

There is disclosed, as a film-forming composition, a dispersion of carbon particles in a solution of a heat-resistant polymer (e.g., polyamic acid, polyamide-imide or aromatic polyamide) in a blend of a suitable polar solvent (e.g., N,N-dimethylformamide or N,N-dimethylacetamide) and a suitable aromatic liquid (e.g., benzene, toluene or xylene); the weight ratio of the polar solvent to the aromatic liquid is about 50:50 to 90:10, preferably about 60:40 to 75:25; the weight ratio of the carbon particles to the polymer is about 7:93 to 45:55; the composition, which has beneficial utility in the manufacture of electrical heating elements, is surprisingly free of the problems associated with premature gelling and undue increase in viscosity.

---

This invention relates to a novel film-forming composition which is resistant to gelling during storage and is useful for the manufacture of flexible polymeric electrical heating elements.

It is known that heat-resistant films can be made by preparing a solution in a polar solvent (e.g. N,N-dimethylformamide) of a polyamic acid, a polyamide-imide or an aromatic polyamide, followed by applying a layer of the solution to a suitable substrate by conventional liquid-coating procedures and then oven-drying the applied layer. However, when one disperses a quantity of conductive carbon particles in such a solution and attempts to use the resulting film-forming composition for the manufacture of heating elements or black protective coatings, one is confronted with the problem of premature gelling of the fluid composition during storage, shipment or agitation. Or the viscosity becomes so high as to make normal coating procedures impractical.

Expressed broadly, the film-forming composition of the present invention consists essentially of carbon particles having a maximum dimension of about 5 to 80 microns dispersed in a solution of a polymer in a solvent mixture:
  said polymer being a heat-resistant, film-forming polymer from the group consisting of polyamic acids, polyamide-imides and aromatic polyamides:
    said solvent mixture being a homogeneous mixture of (A) about 50 to 90% by weight of a polar solvent for said polymer having a dipole moment of more than 3 Debye units and a boiling point below 250° C., and (B) about 10 to 50% by weight of an aromatic liquid having a dipole moment of less than 1.6 Debye units,
  said composition having a viscosity at 25° C. of less than 150 poises.

The best coalescence of the nonvolatile portion of the composition is usually obtained during the drying of coatings and films formed from the novel composition when the boiling point of the aromatic liquid is below that of the polar solvent.

The carbon particles are in a state of dispersion in the polymer solution, and they have a maximum dimension of about 5 to 80 microns. "Maximum dimension" means the diameter of substantially spherical particles or the longest dimension of particles having other shapes such as the thin platelets of graphite.

The carbon particles useful in practicing this invention include all kinds of carbon particles having utility in liquid-coating compositions, for example the conductive carbon blacks often used to impart antistatic properties to polymeric products, as well as other known types of carbon black, and lamp-black, graphite and finely divided charcoal or coke. A carbon black having an average diameter of less than 40 microns and a carbon content of at least 98% is preferred when the composition is to be used for the manufacture of heating elements.

The carbon particles are present in the novel composition in an amount sufficient to give the dry film made therefrom the desired properties, for example suitable electrical conductivity when the film is to be used as a heating element, or the desired color when the film is to be used as a protective coating. The preferred amount of carbon particles in the composition for most applications is the amount that provides a carbon-to-polymer weight ratio of about 7:93 to 45:55. With a given set of ingredients, the gerater the carbon content of the composition, the greater the amount of the aromatic liquid required to obtain maximum gel resistance.

One skilled in the art with the aid of the present disclosure will be able to select a polymer among the three types mentioned above having the necessary heat-resistance and film-forming characteristics for any particular application of the composition. The film-forming polymer component of the novel composition can be wholly aromatic or partly aromatic. A wholly or predominantly aromatic polymer is preferred when the intended application requires maximum heat resistance of the dry coating or film. The backbone of a "wholly aromatic" polymer contains no alkylene units, and except for functional connecting linkages (e.g. amide or imide), consists essentially of single or multiple carbocyclic rings possessing resonance. The backbone of a partly aromatic polymer of course contains both aliphatic and aromatic units. A predominantly aromatic polymer does not contain enough aliphatic units in the backbone to result in a substantial decrease in the polymer's heat resistance.

In order to facilitate preparation of the polymer solution in what is usually the most useful range of viscosity and polymer content, a polymer having an intrinsic viscosity value of less than 2 is preferred (measured at 25° C. with N,N-dimethylformamide as the solvent).

Polyamic acid polymers generally preferred in practicing this invention are made up predominantly of units of (1) a dianhydride from the group consisting of pyromellitic dianhydride and benzophenone tetracarboxylic dianhydride and (2) a diamine from the group consisting of 4,4'-diaminodiphenylether, 4,4'-diaminodiphenylmethane, and m-phenylene diamine. These and other useful polyamic acids and procedures for preparing them are described in U.S. Patents 3,179,614 and 3,179,634 and in copending U.S. patent applications Ser. No. 229,172, filed Oct. 8, 1962; Ser. No. 320,937, filed Nov. 1, 1963; and Ser. No. 328,918, filed Nov. 1, 1963.

Preferred polyamide-imide polymers for use as the polymer component of the composition are made up predominantly of units of trimellitic anhydride and units of a diamine as described in the preceeding paragraph. As commonly used in the art, "units of" herein means "units from the reaction of" the materials listed. These and other useful polyamide-imides and methods for making them are described in U.S. Patent 3,179,635 and in Netherlands patent application No. 6400422, published July 22, 1964.

Preferred aromatic polyamides for the novel composition are made up predominantly of units of an aromatic diacid halide and units of a diamine as described above with respect to the preferred polyamic acids. These and other useful aromatic polyamides and procedures for preparing them are described in U.S. Patent 3,006,899 and in the article "Interfacial Polycondensation" by Emerson et al. in Journal of Polymer Science, 40, 289–297 (1959).

The preferred amount of polymer in the composition for most applications is the amount that provides a polymer-to-carbon particle weight ratio of about 55:45 to 93:7. The preferred polymer content is usually lower in a heating element application than in a protective coating or other nonheating application.

The value "Debye units" referred to above in the general description of the invention with respect to the dipole moment of the two liquids of the solvent mixture is obtained in accordance with the procedure described by Weissberger Technique of Organic Chemistry, Physical Methods of Organic Chemistry, p. 1624 (2nd edition 1949, Interscience Publishers, N.Y.).

Preferred polar solvents for the polymer component are N,N-dimethylformamide (dipole moment=3.86 Debye units, B.P.=153° C.) and N,N-dimethylacetamide (dipole moment=3.81 Debye units, B.P.=165° C.). However, other polar solvents having a dipole moment of more than 3 Debye units and a boiling point below 250° C. can also be used, including formamide; acetamide; N - methylformamide; N - methylacetamide; N,N-diethylformamide; N,N - diethylacetamide; N,N - dipropylformamide; N,N-ethylpropylacetamide; N-methylcaprolactam; dimethylsulfoxide; N-methyl-2-pyrrolidone; tetramethylene urea; pyridine; dimethyl-sulfone; hexamethylphosphoramide; tetramethylene sulfone; butyrolactone; N-acetyl-2-pyrrolidone; and nitro alkanes such as nitroethane and nitropropane.

The aromatic liquid which constitutes the other essential component of the solvent mixture of the novel composition can be any aromatic liquid whose dipole moment is less than 1.6 Debye units. It is usually preferred to use an aromatic liquid whose boiling point is below the boiling point of the polar solvent; particularly when the solvent mixture contains about 30 to 50% by weight of the aromatic liquid. The properties of the dried film tend to be inferior if all of the polar solvent evaporates from the layer of composition before the last portion of the aromatic liquid evaporates. "Aromatic liquid" herein means a liquid composed of one or more compounds having single or multiple carbocyclic rings possessing resonance. The presence of this aromatic liquid in the composition in the amount indicated herein is essential for achieving the beneficial effects of the present invention, including resistance of the composition to premature gelling during storage or agitation.

The aromatic liquid must be sufficiently soluble in or miscible with the polar solvent so that a homogeneous mixture is obtained when the two liquids are blended together. Insufficient miscibility causes a harmful phase separation. It is not necessary that the aromatic liquid by itself be a solvent for the polymer; in fact, it usually is not. But it is necessary that the polymer be in solution in the resulting mixture of the two liquids. If too much of the aromatic liquid is added to the composition, the polymer precipitates and the composition loses its utility.

Preferred aromatic liquids for use in this invention are benzene, toluene and xylene; the dipole moments (Debye units) of these liquids are 0, 0.40 and 0.54 respectively, and their boiling points (° C.) are 80, 110.6 and 139 respectively. Among the other useful aromatic liquids are ethyl benzene, propyl benzene, butyl benzene, phenol, chlorobenzene, biphenyl, naphthalene and chloro toluene. The weight ratio of polar solvent to aromatic liquid in the composition must be about 50:50 to 90:10; however, a ratio of about 60:40 to 75:25 is usually preferred, especially in heating element applications. The preferred aromatic liquid content tends to vary in direct proportion to the amount of carbon particles present, and therefore tends to be greater in heating element applications than in protective coating applications.

The novel compoistion has a viscosity of less than 150 poises as measured on a Brookfield viscometer at 25° C. A viscosity of less than 30 is generally preferred since this tends to facilitate application of the composition to a substrate and tends to provide maximum gelling resistance.

The novel composition is preferably prepared by using a ball mill or equivalent pigment dispersing or grinding apparatus (e.g. roller mill or sand grinder) to disperse the carbon particles thoroughly in a quantity of the polymer solvent or a mixture thereof with the aromatic liquid. Some or all of the polymer component can also be present during the mill dispersing operation. However, when a polyamic acid polymer is used, preferably little or none of this polymer is added to the dispersing mill since it is likely that the mill will generate enough heat to cause premature conversion of the polyamic acid to a polyimide.

The resulting liquid dispersion of carbon particles is then blended with the remaining ingredients that make up the composition, for example a solution containing all or part of the polymer and any remaining liquid components needed to complete the formula.

Additives known to be useful in polymeric film-forming compositions can be added to the composition in an amount that permits retention of the desired properties of the composition and films made therefrom, for example antioxidants, coloring agents, fireproofing agents, curing agents and antisettling agents.

The composition of this invention has surprisingly good stability. It can be stored for an extended period of time without gelling; and it withstands a substantial amount of agitation without gelling. Both of these properties are important for utility in the manufacture of heating elements and protective coatings since no special or costly coating procedures or storage and shipping schedules have to be employed. The novel composition has outstanding utility for the manufacture of flexible electrical heating elements in which the heat is generated substantially uniformly over the entire surface of the element. Flexible polymeric heating elements and static electricity conductors made from preferred embodiments of this invention can be used at very high temperatures for extended periods of time without undue deterioration; for example six months at 240° C. or for three years at 200° C. The composition is also useful for the manufacture of films and coatings for non-heating applications; for example as a heat-resistant and flame-retardant protective coating for wood and other materials. Black coatings and films having excellent gloss and depth of color are obtainable from the novel composition.

A layer of the composition can be applied to various types of substrates by any suitable coating method, for example by conventional knife-spreading, dipping, brushing or roller coating. The wet layer is heated (for example at a temperature below 150° C.) to remove the volatile components. When the composition contains a polyamic acid, the applied layer is also heated sufficiently to convert the polyamic acid to a polyimide, (for example at a temperature above 150° C.).

The examples which follow are given for the purpose of illustrating the invention. All quantities shown are on a weight basis unless otherwise indicated. All viscosity values are Brookfield viscosity values measured at 25° C. Also, N,N-dimethylacetamide is referred to in the abbreviated form of DMA.

EXAMPLE I

A film-forming composition adapted for use in the manufacture of flexible polymeric (polyimide) electrical heating elements is prepared as follows.

Using a ball mill containing ⅜" steel balls, 52 parts of carbon particles are ground for 24 hours in 468 parts of DMA and 252 parts of xylene. The carbon particles consist of a grade of oil-furnace carbon black known commercially as "extra-conductive" grade and having an average particle size of 27 microns and a particle size range of 7 to 37 microns.

Separately, an 18.5% polyamic acid solution is prepared by stirring 74.53 parts of 4,4'-diaminodiphenylether into 678.90 parts of DMA and slowly adding 78.75 parts pyromellitic dianhydride over a 30-minute period at a reaction temperature of about 25° C. Up to 0.82 parts of pyromellitic dianhydride are then added over an additional 30-minute period. Stirring is continued throughout the reaction, which is carried out under a nitrogen atmosphere.

A mixture of 319 parts of the carbon particle dispersion and 215.4 parts of the polyamic acid solution is prepared by stirring the dispersion and the solution together for about 15 minutes. The resulting composition has a weight ratio of dispersed carbon to polyamic acid of 35:65, a total solids content of 9.1% and a viscosity of 26.5 poises (No. 3 spindle, 12 r.p.m.). The weight ratio of polar solvent (DMA) to aromatic liquid (xylene) in the composition is 75:25.

The film-forming composition in this example can be stored for more than eight months at 25° C. without gelling; in fact, there is no substantial change in viscosity after eight months of storage. Also, agitation of the composition for 30 minutes results in no substantial change in viscosity. A one mil thick film (dry film thickness) is prepared by using a doctor knife to spread a layer of the freshly prepared composition on a polished glass plate, heating the layer in an oven at 105° C. for 10 minutes to drive off the volatile components, and then heating at 400° C. for two minutes to convert the polyamic acid to polyimide. During the drying step, all of the aromatic liquid evaporates before the last portion of polar solvent evaporates. The resulting film has a resistance of 62 ohms per square. A one mil film prepared in the same manner from the composition after storage for eight months at 25° C. has a resistance of 66 ohms per square.

The freshly prepared composition and the eight month old composition are substantially equally useful for the preparation of flexible heating elements.

When a film-forming composition is prepared for the purpose of comparison by repeating Example 1 except the xylene is omitted from the composition and is replaced with 252 parts of DMA, the composition has poor stability. When stirred vigorously the viscosity goes above 150 poises very rapidly and gelling occurs in less than 20 minutes; and when a portion of the composition which has not been vigorously agitated is stored at 25° C., it gels in less than two weeks.

EXAMPLE II

A liquid dispersion of 156 parts of carbon particles in 2,230 parts of polar solvent for polyamic acid (DMA) is prepared. The carbon particles and the grinding procedure are the same as described in Example 1. Separately, an 18.5% solution of polyamic acid is prepared by the procedure described in Example 1. Then a film-forming composition having utility in the preparation of heating elements and protective coatings is prepared by mixing together 187.4 parts of the carbon particle dispersion, 881 parts of the polyamic acid solution, 14.8 parts of DMA and 100.7 parts of xylene. The resulting composition has a weight ratio of carbon particles to polyamic acid of 7:93, a total solids content of 14.8% and a viscosity of 20 poises. The weight ratio of DMA to xylene in the composition is 90:10. When the composition is stirred vigorously for 15 minutes, it neither gels nor increases substantially in viscosity.

After the resulting liquid composition is stored for 8 months at 25° C., it is examined for evidence of gel-formation. Surprisingly enough, it not only has not gelled, but there has been little if any increase in viscosity. After 15 months of storage, the composition still has not gelled.

A one mil thick dry film prepared from the composition by the procedure described in Example 1 has a resistance of 25,000 ohms per square.

EXAMPLE III

A film-forming composition useful for the manufacture of heating elements is made by mixing together 56.5 parts of the carbon particle dispersion of Example 2, 707.5 parts of the polyamic acid solution of Example 1, 15.3 parts of DMA and 212.5 parts of xylene. The resulting composition has a weight ratio of carbon particles to polyamic acid of 22:78, a total solids content of 10.3% and a viscosity of 29 poises. The weight ratio of DMA to xylene is 85.6:14.4.

When this composition is stirred vigorously for 15 minutes, its viscosity remains below 30 poises. And after the composition is stored at 25° C. for 12 weeks, it is examined and found to be a free-flowing liquid.

EXAMPLE III-A

A liquid composition is prepared for the purpose of comparison by quickly mixing together (about two minutes) 676 parts of the carbon particle dispersion of Example 2 and 824 parts of the polyamic acid solution of Example 1, both of which are free of aromatic liquid. The resulting composition has a weight ratio of carbon particles to polyamic acid of 22.5:77.5, and a viscosity of 25 poises.

When this composition is stirred vigorously, its viscosity rapidly increases to become a gel within 15 minutes, and after the freshly prepared composition is stored at 25° C. for two weeks, it is examined and found to be a rubbery gel. Black coatings and films formed from the freshly prepared composition have inferior gloss and depth of color compared with coatings and films formed from the composition of the present invention.

EXAMPLE IV

A liquid composition that is useful as a flame retardant protective coating on wood and is useful for the manufacture of heating elements and heat-resistant static electricity conducting materials is produced by mixing together 200 parts of the film-forming composition of Example 3 and 800 parts of the film-forming composition of Example 2. The resulting composition has a weight ratio of carbon particles to polyamic acid of 9.3:90.7, a total solids content of 13.9% and a viscosity of 21.7 poises. The weight ratio of DMA to xylene is 89.1:10.9.

When this composition is stirred vigorously for 15 minutes, its viscosity remains substantially unchanged. Moreover, after the composition is stored at 25° C. for eight months, its viscosity is substantially unchanged.

A one mil thick dry film prepared from the freshly made composition by the process described in Example 1 has a resistance of 7,800 ohms per square while the one mil film prepared from the eight month old composition has a resistance of 8,500 ohms per square.

EXAMPLE V

A film-forming composition useful for the manufacture of flexible polymeric (polyamide-imide) electrical heating elements and sheet materials for conducting static electricity at high temperatures is prepared as follows.

A 29% solution of polyamide-imide polymer is prepared in the following manner. Trimellitic anhydride (702 parts), phenyl acetate (648 parts) and litharge (2.4 parts) are mixed and heated to 200–275° C. with stirring in a flask equipped with a distillation column. Acetric acid (about 210–219 parts) is removed from the column as distillate during this heating operation. When distillation stops, the excess phenyl acetate is removed by stripping at 275° C. and 30 millimeters of mercury. The reaction product mixture is cooled, mixed with 4,000 milliliters of toluene and 5 parts of filter aid, heated to about 105° C. and filtered. Cooling the filtrate below 30° C. crystallizes 4-phenyl trimellitic anhydride ester. The crystals are removed by filtering, washed with 400 parts of toluene and dried at 110° C. (yield: about 925 parts).

A mixture of 402 parts of this 4-phenyl trimellitic anhydride ester, 81 parts of m-phenylene diamine and 783 parts of N-methyl pyrrolidone is heated with stirring in a flask equipped with a distillation column to 130–140° C. About 166 parts of distillate (water of reaction and N-methyl pyrrolidone) are removed over a period of one hour while increasing the pot temperature to 210° C. The mixture is cooled slightly and the equipment is changed to provide refluxing instead of distillation. Another 81 parts of m-phenylene diamine in 126 parts of N-methyl pyrrolidone are added and the mixture is refluxed for 16 hours at 210° C. The reddish-brown solution of polyamide-imide polymer (1,320 parts) is cooled and adjusted to 29% solids by adding 24 parts of N-methyl pyrrolidone.

Then the film-forming composition is prepared in a ball mill containing ⅜″ steel balls, the mill being charged with 11.5 parts of the carbon particles described in Example 1, 18.3 parts of DMA, 22.3 parts of xylene and 47 parts of the 29% polymer solution prepared above in this example. After running the mill for 23 hours, an additional 25.7 parts of the polymer solution are added and the mill is run for another one-half hour.

The resulting composition has a weight ratio of carbon particles to polyamide-imide of 35:65 and a viscosity of 83 poises. The weight ratio of polar solvent (N-methyl-pyrrolidone and DMA) to aromatic liquid (xylene) in the composition is 75:25. After the composition is stored at 25° C. for 32 days, it is examined and found to be a free-flowing liquid whose viscosity is less than 30 poises.

Dry films having a thickness of 1.6 mils are prepared from the freshly-made composition and the 32-day-old composition as follows. A layer of each composition is spread on a polished stainless steel plate, the layer is heated in an oven at 105° C. for 30 minutes to drive off the volatile components, and then the layer is heated at 316° C. for 60 minutes to complete the conversion of the imide-forming portion of the polymer. Each of the resulting films is removed from the steel substrate and is found to have a resistance of 108 ohms per square.

EXAMPLE VI

A film-forming composition useful for the manufacture of flexible polymeric (aromatic polyamide) heating elements and static electricity conductors is prepared as follows.

A carbon particle dispersion is prepared according to the grinding method described in Example 1 except the mill formula consists of 52 parts carbon particles, 468 parts DMA and 252 parts xylene.

Separately, a 19% solution of aromatic polyamide polymer is prepared. The polymer is made by the interfacial polycondensation process described by Emerson, Wittbecker and Morgan in Journal of Polymer Science, 40, 289–297 (1959), the starting materials being 108.1 parts m-phenylene diamine, 142.1 parts isophthalyl chloride and 60.9 parts terephthalyl chloride. The washed and dried polymer is dissolved in DMA to form a 19% solution.

Then the film-forming composition is prepared by mixing together for 15 minutes 319.0 parts of the carbon particle dispersion described above, 209.5 parts of the 19% polymer solution described above, 67.7 parts DMA and 39.4 parts xylene.

The resulting composition has a weight ratio of carbon particles to polyamide of 35:65, a total solids content of 9.6% and a viscosity of 24.5 poises. The weight ratio of DMA to xylene is 75:25.

After the composition is stored at 25° C. for 32 days, it is examined and is found to be a free-flowing liquid which can be applied to substrates by conventional liquid-coating procedures.

I claim:

1. A stable film-forming composition consisting essentially of carbon particles having a maximum dimension of about 5 to 80 microns dispersed in a solution of a polymer in a solvent mixture,
    said polymer being a heat-resistant, film-forming polymer from the group consisting of polyamic acids, polyamide-imides and aromatic polyamides,
        said solvent mixture being a homogenous mixture of (A) about 60 to 75% by weight of a polar solvent for said polymer having a dipole moment of more than 3 Debye units and a boiling point below 250° C. and
        (B) about 40 to 25% by weight of an aromatic liquid having a dipole moment of less than 1.6 Debye units, said composition having a viscosity at 25° C. of less than 150 poises,
the weight ratio of the carbon particles to the polymer being about 7:93 to 45:55.

2. A composition according to claim 1 wherein the polymer is a polyamic acid which consists essentially of units of (1) a dianhydride from the group consisting of pyromellitic dianhydride and benzophenone tetracarboxylic dianhydride and (2) a diamine from the group consisting of 4,4′-diaminodiphenylether, 4,4′-diaminodiphenylmethane, and m-phenylene diamine.

3. A composition according to claim 1 wherein the polymer is a polyamide-imide which consists essentially of units of trimellitic anhydride and units of a diamine from the group consisting of 4,4′-diaminodiphenylether, 4,4′-diaminodiphenylmethane, and m-phenylene diamine.

4. A composition according to claim 1 wherein the polymer is an aromatic polyamide which consists essentially of units of an aromatic diacid halide and units of a diamine from the group consisting of 4,4′-diaminodiphylether, 4,4′-diaminodiphenylmethane and m-phenylene diamine.

5. A composition according to claim 1 wherein said polar solvent is from the group consisting of N,N-dimethylformamide and N,N-dimethylacetamide, and said aromatic liquid is from the group consisting of benzene, toluene and xylene.

6. A composition according to claim 1 having a viscosity at 25° C. of less than 30 poises.

References Cited

UNITED STATES PATENTS

| | | | |
|---|---|---|---|
| 3,260,691 | 7/1966 | Lavin | 260—302 |
| 3,261,811 | 7/1966 | Tatum | 260—37 |
| 3,310,506 | 3/1967 | Amborski | 260—37 |
| 3,316,212 | 4/1967 | Angelo | 280—37 |
| 3,316,213 | 4/1967 | Berr | 260—37 |
| 3,326,863 | 6/1967 | Tatum. | |

OTHER REFERENCES

Drogin, "S.P.E. Journal," March 1965, pp. 248–252.

MORRIS LIEBMAN, *Primary Examiner.*

H. H. FLETCHER, *Assistant Examiner.*

U.S. Cl. X.R.

252—511; 260—30.2, 30.4, 30.6, 30.8, 31.2, 33.6, 37